Nov. 9, 1943. H. W. HAPMAN 2,333,926
CONVEYER
Filed Jan. 25, 1941 3 Sheets-Sheet 1
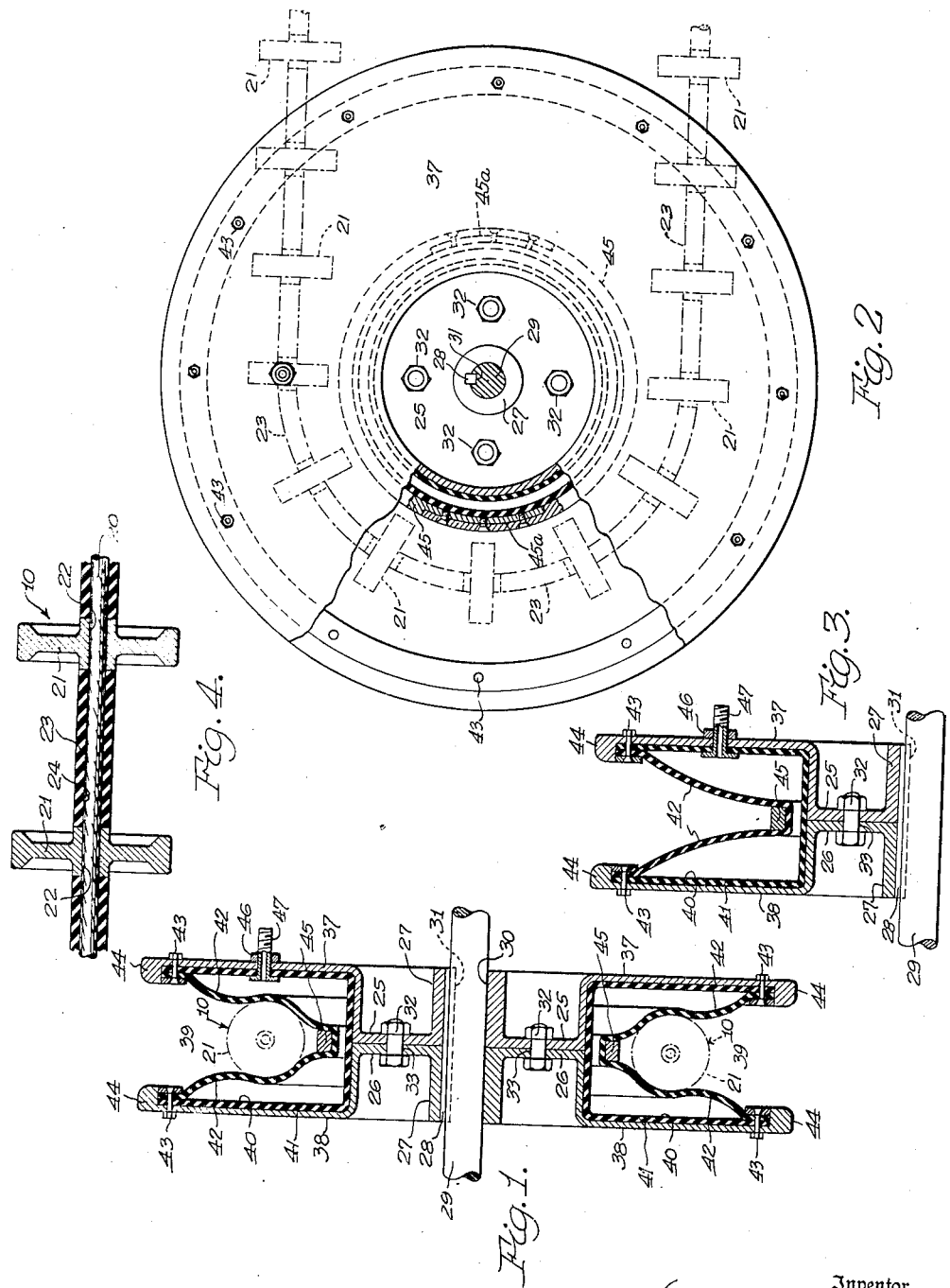

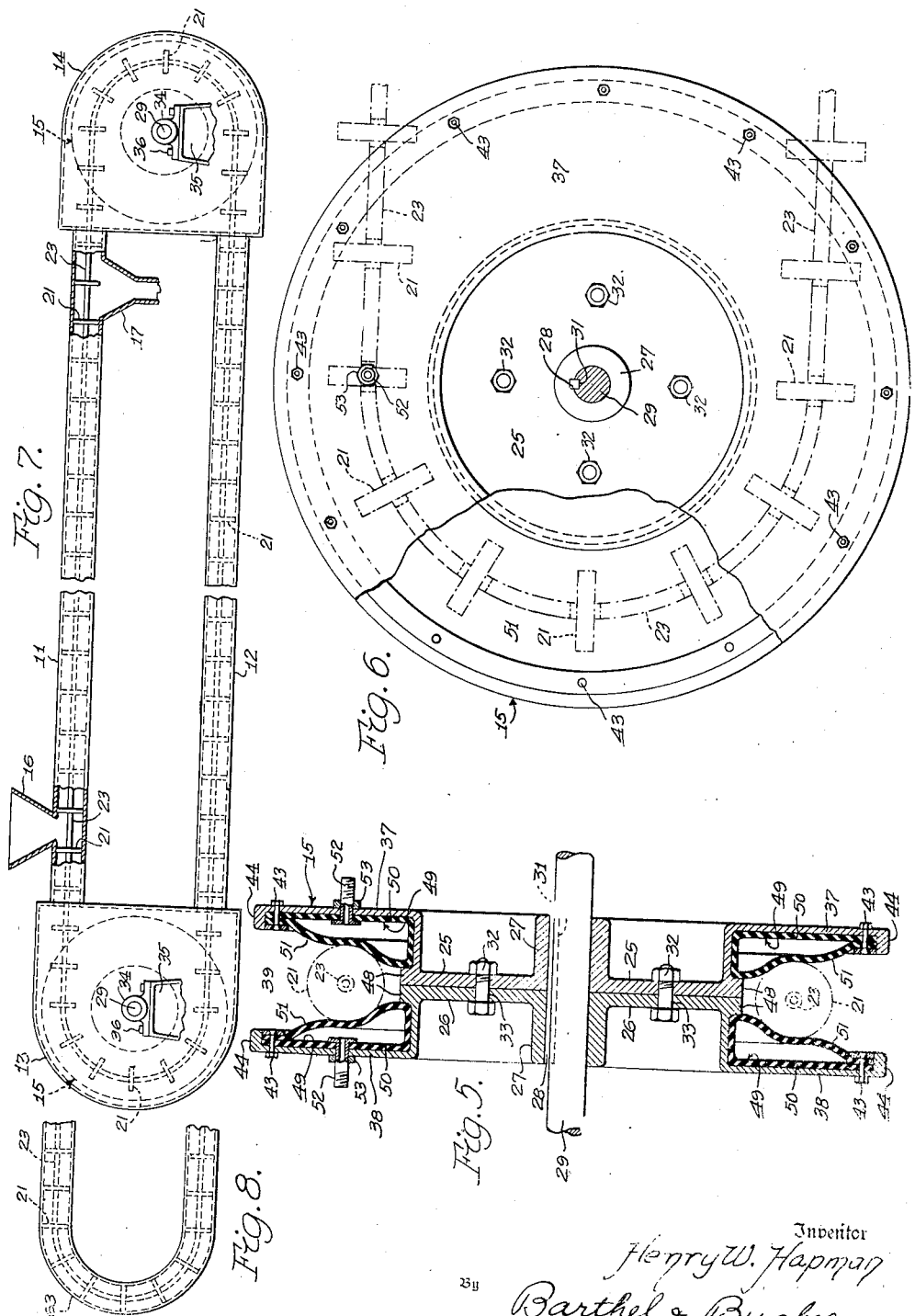

Nov. 9, 1943.　　　　H. W. HAPMAN　　　　2,333,926
CONVEYER
Filed Jan. 25, 1941　　　　3 Sheets-Sheet 3

Inventor
Henry W. Hapman
By Barthel & Bugbee
Attorneys

Patented Nov. 9, 1943

2,333,926

UNITED STATES PATENT OFFICE 2,333,926

CONVEYER

Henry W. Hapman, Detroit, Mich.

Application January 25, 1941, Serial No. 375,946

18 Claims. (Cl. 74—230.7)

This invention relates to conveyers.

One object of this invention is to provide a conveyer for conveying powdered or granular material without the use of sprockets or sprocket chains and having automatic compensation for stretching, wear or temperature changes of the conveyer.

Another object is to provide a conveyer having an endless flexible connector with spaced flights thereon operating in a conduit system and supported at one or more locations by pulleys having inflatable liners in the pulley grooves so as to cushion and more firmly grip the conveyer flights, as well as automatically adjusting the conveyer to stretching, wear or temperature changes.

Another object is to provide a conveyer as set forth in the preceding objects wherein the inflatable liners are mounted upon pulleys having halves rigidly mounted upon the supporting mechanism.

Another object is to provide a conveyer as set forth in the preceding objects wherein the space between the pulley disks or halves is occupied by an inflatable liner having inwardly inclined annular walls terminating in a floating ring so that the endless conveyer flights will automatically adjust themselves to the most suitable positions and at the same time will be partially encircled by the inflatable liner so that a very firm driving grip will be obtained thereon.

Another object is to provide a conveyer as set forth in the preceding objects wherein the inflatable liner is made of rubber-like material, such as natural or synthetic rubber, so that the noise of the conveyer is deadened and the vibration effectively cushioned during operation.

Another object is to provide a conveyer having an endless assembly of non-circular cross section supported at one or more locations by a pulley having annular inflatable liners engaging and firmly gripping the sides of the endless conveyer assembly, this assembly being preferably transversely elongated.

Another object is to provide a conveyer as set forth in the preceding objects wherein the endless conveyer assembly operates in a conduit system and is supported at one end by a U-shaped conduit instead of a pulley.

In the drawings:

Figure 1 is an axial section through a conveyer and supporting pulley of a preferred embodiment of the present invention.

Figure 2 is a side elevation, partly in section, of the pulley and conveyer shown in Figure 1.

Figure 3 is an axial section through a portion of the pulley shown in Figure 1, but with the endless conveyer unit removed.

Figure 4 is a longitudinal section through a portion of one form of endless conveyer unit which may be employed in the conveyer according to the invention.

Figure 5 is an axial section through a modification of the conveyer supporting pulley with the endless conveyer in position wherein two inflatable lines of annular form are employed to support and grip the endless conveyer unit.

Figure 6 is a side elevation, partly in section, of the conveyer and pulley shown in Figure 5.

Figure 7 is a side elevation, partly in section, of a complete conveyer according to the present invention.

Figure 8 is a side elevation of a modification of Figure 7, employing a U-shaped conduit instead of a pulley at one end of the conveyer.

General arrangement

In general, the conveyer of this invention consists of an endless flexible member, such as a flexible cable or chain carrying spaced disks, bars or other transverse members for conveying the material, and operating in a system of conduits of similar cross-section. The endless conveyer unit is supported at one or more locations upon pulleys having inflatable liners between the pulley halves or disks. The latter, however, are rigidly mounted upon the supporting shaft and are not axially movable relatively to each other during operation.

In the form of the invention shown in Figures 1 to 3, the inflatable liner is preferably of rubber-like material and occupies the space between the pulley halves near the peripheries thereof. The inner portion of this liner is of annular form and tapers inwardly to a floating ring which is spaced apart from the remainder of the pulley so that it can move into an eccentric position relatively to the axis of rotation and can generally adapt itself to changes in the driving conditions. When the endless conveyer unit is in position in the liner, the latter is pushed outwardly and partially encircles the flights or disks mounted on the endless connector of the conveyer, as shown in Figure 1. When the endless conveyer is removed, however, the liner walls move toward each other and have a substantially V-shaped cross section, as shown in Figure 3.

In the modification shown in Figures 5 and 6, the pulley is provided with a pair of inflatable liners of annular shape, gripping the opposite sides of the conveyer flights. The conveyer flights or disks mounted on the endless connector, such as a flexible metal cable, are of approximately circular cross section in this modification, as in the principal form shown in Figures 1 to 3.

Figure 11:
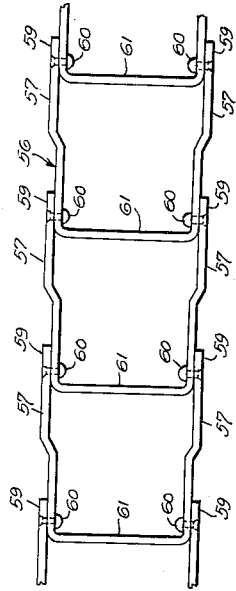
Figure 11 is a top plan view of a portion of the transversely elongated endless conveyer unit used in the modification of Figures 9 and 10.
Figure 10:
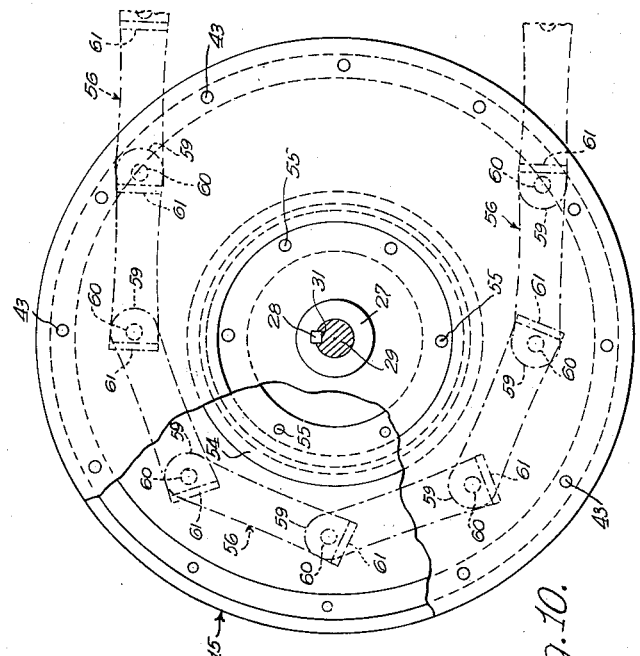
Figure 10 is a side elevation, partly in section, of the modification shown in Figure 9.
Figure 9:
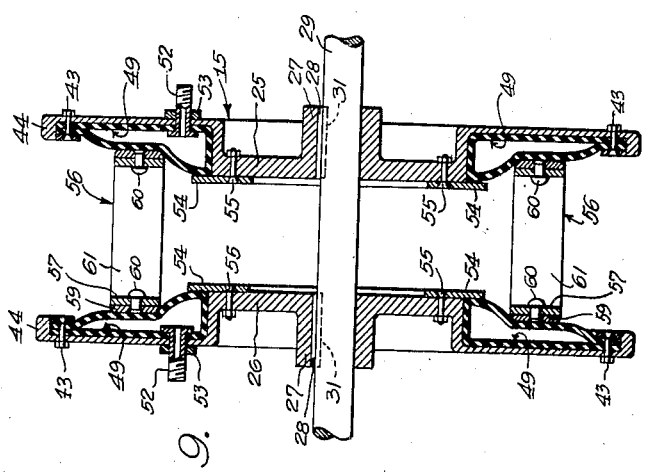
Figure 9 is an axial section through a conveyer supporting pulley employing two annular inflatable liners and using a transversely elongated endless conveyer.

In the modification shown in Figures 9 to 11, the pulley is provided with a pair of inflatable liners as in Figures 5 and 6. The endless conveyer unit, however, in this modification, is transversely elongated and is thereby adapted to convey particles of larger size or in greater quantities than the preceding forms of the invention. This form, moreover, operates in conduits of non-circular cross section.

The modification shown in Figure 8 dispenses with one of the pulleys at one end of the conveyer and instead employs a U-shaped conduit in which the conveyer runs.

Hitherto, conveyers using endless flexible members have ordinarily employed sprockets and sprocket chains for supporting and driving the conveyer flights. In such conveyers, the concentration of the load upon the sprocket teeth and links of the chain have resulted in rapid wear, high upkeep cost, and deterioration in the presence of abrasive or corrosive materials. Such conveyers have also been very noisy in operation and have required frequent attention and take-up because of the tendency of such conveyers to stretch. Other conveyers employing flexible cables have been subject to stretch to a much greater extent, especially when they are first put into use.

In the conveyer of the present invention, however, the load is distributed between all of the flights of the conveyer which are in engagement with the inflatable liners arranged between the pulley halves or disks. This construction not only cushions the endless conveyer and reduces noise and vibration, but also automatically takes up stretch or other changes in length as the conveyer is operated, including thermal expansion or contraction resulting from weather changes. The inflatable liners also partially encircle the conveyer flights with a grip of increased force, thereby reducing slippage.

Furthermore, the inflatable liner construction of the present invention absorbs the shock which occurs when the load first comes on the pulley, thereby giving a cushioned or resilient effect. In this manner there is less jerking and a more even application of power in starting the conveyer. When the load thus comes on the pulley, the air pressure within the liner, particularly in the form shown in Figures 1 to 3, will be distributed throughout the liner on opposite sides thereof, thereby moving the liner ring into eccentricity relatively to the driving axis, since there is a load on one side and relief on the other side.

Flexible conveyer construction

Referring to the drawings in detail, Figures 1 to 4 and 7 show the conveyer system of this invention as consisting of an endless conveyer assembly generally designated 10 (Figure 4), a pair of relatively straight conduits or pipes 11 and 12, and a pair of end housings 13 and 14 containing the supporting and driving pulleys generally designated 15. The straight conduit 11 is provided with an inlet hopper 16 and a discharge conduit 17 at opposite ends thereof.

The conveyer system shown in Figure 7, however, is a simplified showing fulfilling the minimum requirements of such a conveyer. It will be evident, however, that such a conveyer system may be partially horizontal and partially vertical or inclined, according to the particular requirements. Under these circumstances, it is usually necessary to provide more than two supporting pulleys, or else to provide bent portions in the conduits in order to change the direction of the travelling portion of the conveyer system. Such a bent conduit portion is shown in Figure 8, and may replace one of the end housings 13 or 14 and one of the pulleys 15.

The travelling conveyer unit 10 (Figure 4) consists of a flexible connector 20, such as a flexible stranded metal cable arranged in an endless path and with its opposite ends joined by a suitable coupling or splicing (not shown). Mounted at spaced intervals along the flexible connector 20 are the disk-like conveyer flights 21 having bores 22 through which the flexible connector 20 passes. The flights 21 may be of non-corrosive material, such as hard rubber, synthetic resin, or the like when corrosive materials are to be conveyed, or they may consist of metal covered by such corrosion-resisting materials.

The conveyer flights 21 are spaced apart from one another by tubular spacers 23 of rubber-like material, such as natural or synthetic rubber or synthetic resin, and have internal bores 24 through which the flexible connector or cable 20 passes. In place of the cable 20, a chain may also be used. In assembly, the spacers 23 are preferably compressed longitudinally as they are mounted alternately with the flight 21 upon the flexible cable 20. The free ends of the flexible connector 20 are spliced or joined by a coupling with the final flight 21 separated from its adjacent flight somewhat less than the length of the final spacer 23. The latter is then split lengthwise, forced into this short space, cemented in place and taped, thereby becoming compressed longitudinally along with the other spacers 23. Thus, when the flexible connector 20 stretches during the early portion of its working life, the compressed rubber-like spacers 23 also expand longitudinally and maintain complete coverage of the flexible connector 20.

Thus, the flexible connector 20 is completely protected from contact with the materials being conveyed, and vice versa, so that neither can attack or contaminate the other. The conveyer unit 10 and the method of making the same are disclosed and claimed in my co-pending application Serial No. 375,945, filed January 25, 1941. The modified form of conveyer unit shown in Figures 9 and 10 is described and claimed herein.

Pulley construction

The pulleys 15 (Figures 1 to 3) which support and drive the travelling conveyer unit 10 consists of pulley disks or halves 25 and 26 having hubs 27 keyed as at 28 to the shaft 29 and having bores 30 for receiving the shaft, which is provided with a keyway 31 for receiving the keys 28. The pulley halves 25 and 26 are secured to one another in any suitable way, as by the bolts 32 passing through the holes 33 in the webs thereof. The pulley shaft 29 is journaled in a bearing 34 mounted upon supports 35 (Figure 7) and bolted thereto as at 36.

The pulley halves or disks 25 and 26 are provided at their peripheries with oppositely bent portions 37 and 38 forming an annular chamber or groove 39. Mounted within this chamber or groove 39 is an inflatable liner generally designated 40 and consisting of an outer wall 41 and an inner wall 42 secured as at 43 to the peripheries of the portions 37 and 38. The peripheral edges of the liner portions or walls 41 and 42 are covered and protected by the peripheral flanges 44. These extend toward one another and also serve as guides for the travelling conveyer unit 10 when the latter is dropped into position.

The inner wall 42 of the inflatable liner 40 is approximately V-shaped in cross-section in the absence of the conveyer unit 10 (Figure 3) and terminates in a floating ring 45 which is normally spaced apart from contact with the pulley halves 25 or 26. The inflatable liner 41 is inflated by means of a hollow flanged nipple 46 passing through the side wall 37 of the pulley half 25 and secured thereto by the nut 47. Ring 45 has split joints 45a.

The inflatable liner 40 is preferably made of rubber-like material, such as natural or synthetic rubber or synthetic resin, and is inflated by compressed air or other suitable gas. When so inflated, the walls 42 of the liner 40 are pushed inwardly so that they partially encircle the conveyer flights 21 (Figure 1). This gives a very powerful driving grip and at the same time cushions the conveyer system against the shock of starting and also against noise and vibration.

In the modification shown in Figures 5 and 6, the pulley halves 25 and 26 are substantially the same as those in Figure 1 except that they are preferably provided with central flanges 48 forming an annular ridge. Mounted within the annular peripheral groove 39 on each side of the central annular flanges 48 is an inflatable liner 49 having an outer wall 50 and an inner wall 51 forming an extension thereof and secured to each other and to the peripheries of the pulley halves 25 and 26 by the bolts 43 as before. The peripheral flanges 44 also serve to cover the otherwise exposed edges of the inflatable liner 49, which, as before, is of rubber-like material such as natural or synthetic rubber or synthetic resin.

In the modification of Figure 5, the inflatable liners 49 are thus independent of one another and are inflated by means of hollow flanged nipples 52 secured to the pulley portions 37 and 38 by the nuts 53.

The modification shown in Figures 9 to 11 is similar to that shown in Figures 5 and 6, except that the pulley halves 25 and 26 are separated axially and mounted in spaced relationship along the shaft 29. The flanged portions 48 may be provided as in Figure 5 or a retaining ring 54 may be secured as at 55 to the webs of the pulley halves or disks 25 and 26 in order to hold the inflatable liners 49 in their proper positions. The remainder of the pulley in Figures 9 and 10 is similar to that of Figures 5 and 6.

The modification of Figures 9 to 11, however, is intended to employ a transversely elongated travelling conveyer unit 56 (Figures 9 and 11) consisting of U-shaped links 57 bent as at 58 to maintain their free ends 59 substantially in alignment when they are pivotally secured as at 60 to the closed ends 61. The latter serve as transverse partitions and also as pushers for the material being conveyed. The travelling conveyer unit 56 moves in a conduit of substantially the same elongated cross section, rather than the substantially circular cross section employed by the travelling conveyor unit 10 with its circular flights 21. The modified pulley of Figures 9 and 10 is not necessarily confined to use with the exact type of endless conveyor shown in Figure 11. Obviously, any other suitable conveyer unit may be used therewith and not merely the drag type shown. The modification of Figure 8 employs a U-shaped conduit 63 at one end of the conveyer instead of a pulley 15.

*Operation*

In the operation of the conveyer system of this invention, one or more of the pulleys 15 is driven by applying power to the shaft 29. The frictional engagement between the inner walls 42 or 51 of the inflatable liners 40 or 49 furnishes a powerful grip upon the travelling conveyer units 10 or 56, causing them to be moved in their orbital paths and thereby conveying the materials dropped into the hopper 16 through the conduit 11 and out through the conduit 17.

The hollow liners 40 or 49 are inflated to a pressure which is suitable for the conditions of conveying, so that a firm grip is maintained upon the travelling conveyer unit 10 or 56. The distance between the shafts 29 at the opposite ends of the conveyer is made such that the conveyer unit 10 or 49 will occupy a position nearer the bottom of the groove 39 when the conveyer is first put into operation. As the flexible connector 20 stretches during its early life, the lengthening thereof is automatically taken up by the inflatable liners 40 and 49, which force the conveyer flights 21 or links 57 outwardly toward the peripheral flanges 44. On the other hand, if low temperature or other conditions bring about a contraction of the flexible connector 20, the travelling conveyer unit 10 moves to a position nearer the shaft 29, as shown in Figure 1.

When the conveyer is started in operation, the shock of the load is immediately absorbed by the inflatable liner through its engagement with the conveyer flights 21 or links 57. This results in a yielding which serves to cushion the mechanism against jerks and which also prevents vibration. When the load is applied in this manner to one side of the pulley, the air pressure is built up on the other side and acts on all of the flights or links in contact with the liner walls. Thus, unlike a sprocket and sprocket chain installation, the load is distributed over many points in the pulley and not concentrated at the entering tooth of the sprocket.

Furthermore, when the load comes on the floating ring 45 (Figures 1 and 3), the latter is capable of yielding in a transverse direction and of coming to rest temporarily in a position eccentric to the axis of the shaft 29. In this manner the pulley and travelling conveyer unit are self-aligning and self-adjusting with respect to each other. Furthermore, the conveyer flights 21 or links 57 engage the liner walls 42 or 51 at different locations during different revolutions of the pulleys 15, hence the wear on the liners is distributed and not rigidly concentrated at the same points, as in the case of the sprocket teeth and sprocket chain links of prior art conveyers.

As previously stated, the spacers 23 of the travelling conveyer units 10 are assembled in a state of compression. As the flexible cable 20 stretches during the early portion of its operating life, therefore, the tubular spacers 23 expand longitudinally to compensate for the stretch of the cable, due to the fact that they are made of rubber-like material.

The operation of the modification of Figures 5 and 6 is similar to that of Figures 1 to 3, except that the floating ring 45 is absent and its effect consequently lacking. The pressure on the opposite walls 51 of the liners 49 is also not equalized as in the case of the form shown in Figure 1, since there are two separate inflatable liners. It will be understood, however, that the two liners can be interconnected by a conduit extending between the two hollow nipples 52, as through the webs of the pulley halves 25 and 26.

The operation of the modification shown in Figures 9 to 11 is likewise similar to that of the modification shown in Figures 5 and 6. The endless conveyer unit 56, however, is of larger capacity than the conveyer units 10 with their circular flights 21, since the cross members or closed ends 61 of the links 57 may be made as wide as desired without unduly increasing the diameters of the pulleys 15. The transversely elongated endless conveyer unit 56 is well adapted for large capacity installations such as the conveyance of ashes or coal in a power plant or wood particles in a woodworking establishment.

While a specific embodiment of the invention has been described and illustrated, it will be understood that various modifications may be made within the scope of the appended claims without departing from the spirit of the invention.

What I claim is:

1. A pulley for flexible conveyers comprising a substantially circular pulley body having an annular groove, inwardly directed peripheral recesses formed therein, and hollow inflatable liner means of rubber-like material having the peripheral edge secured to the inner walls of said peripheral recess in engagement with the conveyer.

2. A pulley for flexible conveyers comprising shaft means, a plurality of pulley halves fixedly secured to said shaft means, said pulley halves having inwardly directed axially extending peripheral portions, and hollow inflatable liner means of rubber-like material having its peripheral portion secured to the inner walls of said peripheral portions of said pulley halves for engagement with the conveyer.

3. A pulley for flexible conveyers comprising a pair of pulley disks having inwardly extending peripheral portions forming an annular recess, and a hollow inflatable liner of rubber-like material anchored in said recess, to the inwardly extending peripheral portions.

4. A pulley for flexible conveyers comprising a plurality of pulley disks having oppositely extending peripheral portions forming an annular recess, a hollow inflatable liner of rubber-like material secured in said recess with its walls extending inwardly toward the axis of rotation thereof, and an annular member encircling said axis of rotation and engaging said inflatable liner.

5. A pulley for flexible conveyers comprising a plurality of pulley disks having oppositely extending peripheral portions forming an annular recess, a hollow inflatable liner of rubber-like material secured in said recess with its walls extending inwardly toward the axis of rotation thereof, and a freely floating annular member encircling said axis of rotation and engaging said inflatable liner at its location of nearest approach to said axis of rotation.

6. A pulley for flexible conveyers comprising a substantially circular pulley body with an annular recess in the periphery thereof, and a hollow inflatable liner of approximately U-shaped cross section secured in said recess.

7. A pulley for flexible conveyers comprising a substantially circular pulley body with an annular recess in the periphery thereof, a hollow inflatable liner of approximately U-shaped cross section secured in said recess, and an annular member secured to and encircling said liner within said recess.

8. A pulley for flexible conveyers comprising a substantially circular pulley body with an annular recess in the periphery thereof, a hollow inflatable liner of approximately U-shaped cross section secured in said recess, and a freely floating annular member encircling said liner and engaging its inner wall at the line of nearest approach to the axis of rotation of the pulley.

9. A pulley for flexible conveyers comprising a substantially circular pulley body with an annular recess in the periphery thereof, and a hollow inflatable liner with its outer wall secured in said recess and its inner wall secured to said outer wall and pulley body adjacent the periphery thereof and extending inwardly toward the axis of rotation of said pulley.

10. A pulley for flexible conveyers comprising a substantially circular pulley body with an annular recess in the periphery thereof, and a hollow inflatable liner with its outer wall secured in said recess and its inner wall secured to said outer wall and pulley body adjacent the periphery thereof and extending inwardly toward the axis of rotation of said pulley, said pulley body having peripheral flanges extending toward each other over the edges of said liner walls whereby to protect said liner wall edges.

11. A pulley for flexible conveyers comprising a substantially circular pulley body with an annular recess in the periphery thereof, a hollow inflatable liner with its outer wall secured in said recess and its inner wall secured to said outer wall and pulley body adjacent the periphery thereof and extending inwardly toward the axis of rotation of said pulley, and a ring spaced apart from said pulley and encircling the inner wall of said inflatable liner at its nearest approach to the axis of rotation of said pulley.

12. A pulley for flexible conveyers comprising a substantially circular pulley body with an annular recess in the periphery thereof, and a pair of hollow inflatable pulley liners of approximately triangular cross section mounted adjacent the opposite lateral walls of said pulley body recess.

13. A pulley for flexible conveyers comprising a substantially circular pulley body with an annular recess in the periphery thereof, a pair of hollow inflatable pulley liners of approximately triangular cross section mounted adjacent the opposite lateral walls of said pulley body recess, and a projection extending between said pulley liners in said recess whereby to maintain said liners in spaced relationship.

14. A pulley for flexible conveyers comprising a substantially circular pulley body with an annular recess in the periphery thereof, a pair of hollow inflatable pulley liners of approximately triangular cross section mounted adjacent the opposite lateral walls of said pulley body recess, and means for inflating said liners.

15. A pulley for flexible conveyers comprising a pair of pulley halves mounted in spaced relationship, said pulley halves having axially offset peripheral portions, and hollow inflatable liners disposed in said offset portions for engagement with the conveyer.

16. A pulley for flexible endless conveyers of elongated cross section comprising a pair of axially-spaced pulley halves having offset annular peripheral portions facing one another, and a pair of annular hollow inflatable liners secured respectively to the inner peripheral walls of said offset portions of said pulley halves for engagement with said conveyer.

17. A pulley for flexible conveyers comprising a pair of pulley halves mounted in spaced relationship, said pulley halves having axially offset peripheral portions, and hollow inflatable liners disposed in said offset portions for engagement with the conveyer, said hollow inflatable liners being of substantially triangular cross section.

18. A pulley for flexible conveyers comprising a pair of pulley halves mounted in spaced relationship, said pulley halves having axially offset peripheral portions, hollow inflatable liners disposed in said offset portions for engagement with the conveyer, said hollow inflatable liners being of substantially triangular cross section, and annular retaining portions secured to said pulley halves adjacent said liners.

HENRY W. HAPMAN.